US012239861B2

(12) United States Patent
Landis

(10) Patent No.: US 12,239,861 B2
(45) Date of Patent: Mar. 4, 2025

(54) LOW PRESSURE ALARM FOR SELF-CONTAINED BREATHING APPARATUS

(71) Applicant: 3M INNOVATIVE PROPERTIES COMPANY, St. Paul, MN (US)

(72) Inventor: Jeffrey L. Landis, Charlotte, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 591 days.

(21) Appl. No.: 17/629,875

(22) PCT Filed: Jul. 15, 2020

(86) PCT No.: PCT/IB2020/056663
§ 371 (c)(1),
(2) Date: Jan. 25, 2022

(87) PCT Pub. No.: WO2021/019348
PCT Pub. Date: Feb. 4, 2021

(65) Prior Publication Data
US 2022/0249880 A1 Aug. 11, 2022

Related U.S. Application Data

(60) Provisional application No. 62/879,279, filed on Jul. 26, 2019.

(51) Int. Cl.
*A62B 9/00* (2006.01)
*A62B 7/02* (2006.01)
*A62B 9/02* (2006.01)

(52) U.S. Cl.
CPC ................ *A62B 9/006* (2013.01); *A62B 7/02* (2013.01); *A62B 9/02* (2013.01)

(58) Field of Classification Search
CPC .. A62B 9/006; A62B 7/02; A62B 9/02; A62B 7/00
See application file for complete search history.

(56) References Cited

U.S. PATENT DOCUMENTS 3,244,196 A * 4/1966 Replogle ................ A62B 9/006 137/557
3,611,981 A * 10/1971 Warncke ................. G01L 19/08 137/557

(Continued)

FOREIGN PATENT DOCUMENTS

CN 102205174 A 10/2011
EP 0800844 10/1997
EP 1923100 5/2008

OTHER PUBLICATIONS

CN-205722319-U; Liu, "An Emergency Evacuation Signal Issuing Device", 2016. (Year: 2016).*

(Continued)

*Primary Examiner* — Kristina M Deherrera
*Assistant Examiner* — Tania Courson
(74) *Attorney, Agent, or Firm* — David B. Patchett

(57) ABSTRACT

A self-contained breathing apparatus including a face mask, an air tank for storing and delivering pressurized air, a pressure reducer for reducing the pressure of pressurized air delivered by the air tank to a breathable pressure, wherein the pressure reducer comprises a pressure reducer inlet that is in communication with an air tank outlet, an alarm system including an alarm system inlet that is in communication with a pressure reducer outlet, wherein a first air path connects the pressure reducer outlet to the alarm system inlet, and wherein the alarm system further comprises an alarm system outlet, and a second air path including an (Continued)

second air path inlet in communication with the alarm system outlet and a second air path outlet in communication with the face mask.

20 Claims, 8 Drawing Sheets

(56) References Cited

U.S. PATENT DOCUMENTS

| | | | | |
|---|---|---|---|---|
| 3,719,160 | A * | 3/1973 | Christianson | B63C 11/2209 73/702 |
| 3,811,400 | A * | 5/1974 | Smilg | A62B 9/006 137/557 |
| 4,250,876 | A | 2/1981 | Kranz | |
| 5,022,790 | A * | 6/1991 | Stevenson | B63C 11/26 441/89 |
| 5,097,826 | A | 3/1992 | Gray | |
| 5,365,923 | A | 11/1994 | Lundberg | |
| 6,032,664 | A | 3/2000 | Gray | |
| 6,688,253 | B2 * | 2/2004 | Frink | B63C 11/26 116/210 |
| 7,647,927 | B2 | 1/2010 | Teetzel | |
| 8,091,422 | B2 * | 1/2012 | Felske | B63C 11/02 128/204.22 |
| 9,387,299 | B2 | 7/2016 | Zwolinsky | |
| 10,536,528 | B2 * | 1/2020 | Parkulo | H04L 67/12 |
| 11,524,186 | B2 * | 12/2022 | Musgrove | A62B 9/02 |
| 2005/0115560 | A1 | 6/2005 | Kling | |
| 2012/0000465 | A1 * | 1/2012 | Cavaliere | A62B 9/04 128/202.27 |

OTHER PUBLICATIONS

International Search Report for PCT International Application No. PCT/IB2020/056663, mailed on Oct. 20, 2020, 3 pages.

* cited by examiner

LOW PRESSURE ALARM FOR SELF-CONTAINED BREATHING APPARATUS

TECHNICAL FIELD

The present invention relates to self-contained breathing apparatuses and related safety equipment, and more particularly relates to alarms positionable along an air path for use as an end-of-service-time indicator.

BACKGROUND

A self-contained breathing apparatus is a device generally used to provide respiratory protection to a person that is going to be located in an objectionable, oxygen-deficient, and/or otherwise potentially unbreathable or toxic environment. Such apparatuses generally include one or more warning devices designed to alert the user when certain operating parameters have changed, such as when only a certain predetermined amount of air remains available to the user before the apparatus is no longer operable. In such a situation, an alarm that is commonly referred to as an "end-of-service-time indicator" will be triggered, thereby alerting the user that they have a limited amount of time to move to an area in which the apparatus is no longer needed and/or to replace one or more depleted air cylinders of their apparatus.

A number of end-of-service-time indicators have been used with such self-contained breathing apparatuses, such as audible alarms or lights that flash or provide other visual indicators to the user's face mask, for example. While such indicators can be effective in certain environments, other environments in which the user is located can be particularly noisy, smoky, or otherwise difficult for a user to be able to hear and/or see an indicator. Therefore, it is desirable to provide additional options to a user for end-of-service-time indicators that can be used in such environments.

SUMMARY

In accordance with embodiments described herein, an embodiment of a self-contained breathing apparatus includes a face mask, an air tank for storing and delivering pressurized air, a pressure reducer for reducing the pressure of pressurized air delivered by the air tank to a breathable pressure, wherein the pressure reducer comprises a pressure reducer inlet that is in communication with an air tank outlet, an alarm system comprising an alarm system inlet that is in communication with a pressure reducer outlet, wherein a first closed air path connects the pressure reducer outlet to the alarm system inlet, and wherein the alarm system further comprises an alarm system outlet, and a second air path comprising an second air path inlet in communication with the alarm system outlet and a second air path outlet in communication with the face mask.

The alarm system may be an end-of-service time indicator configured to provide a detectable alarm when at least one predetermined operating parameter is reached, wherein the detectable alarm may be a vibrating member or an audible alarm. The predetermined operating parameter may be a secondary air pressure at the pressure reducer outlet that is higher than a primary air pressure. The primary air pressure may be in the range of approximately 85 psi to approximately 110 psi, and the secondary air pressure may be in the range of approximately 145 psi to approximately 170 psi. In addition, the secondary air pressure may be in the range of approximately 25% to approximately 37% of a rated service pressure of the air tank.

In accordance with embodiments described herein the alarm system is positioned along an air path from the pressure reducer outlet and an inlet to the face mask. The alarm system may be positionable at a user's upper torso area. The face masks used with systems described herein can generally include a mask-mounted regulator.

BRIEF DESCRIPTION OF THE DRAWINGS

The present invention will be further explained with reference to the appended Figures, wherein.

DETAILED DESCRIPTION

Self-contained breathing apparatuses can include a wide variety of equipment configurations, wherein one exemplary configuration that can be used with alarms of the type described herein is an apparatus that generally includes a backframe and harness assembly, a cylinder and valve assembly that facilitates the storage of a supply of breathing air under pressure, a dual-path pressure reducer mounted on the backframe, a facepiece-mounted pressure demand breathing regulator, and a facepiece or mask with a head harness to secure the facepiece to a user's face.

The self-contained breathing apparatuses described herein can further include one or more end-of-service-time indicators that are designed to alert the user when certain predetermined operating parameters have changed such that only a limited amount of air remains available for use. One such indicator can be associated with a dual redundant pressure reducer 10 of the type illustrated in FIGS. 1-5. These figures illustrate how low pressure breathing air is regulated and flows through the regulator during inhalation and exhalation cycles during typical use.

Figure 1:
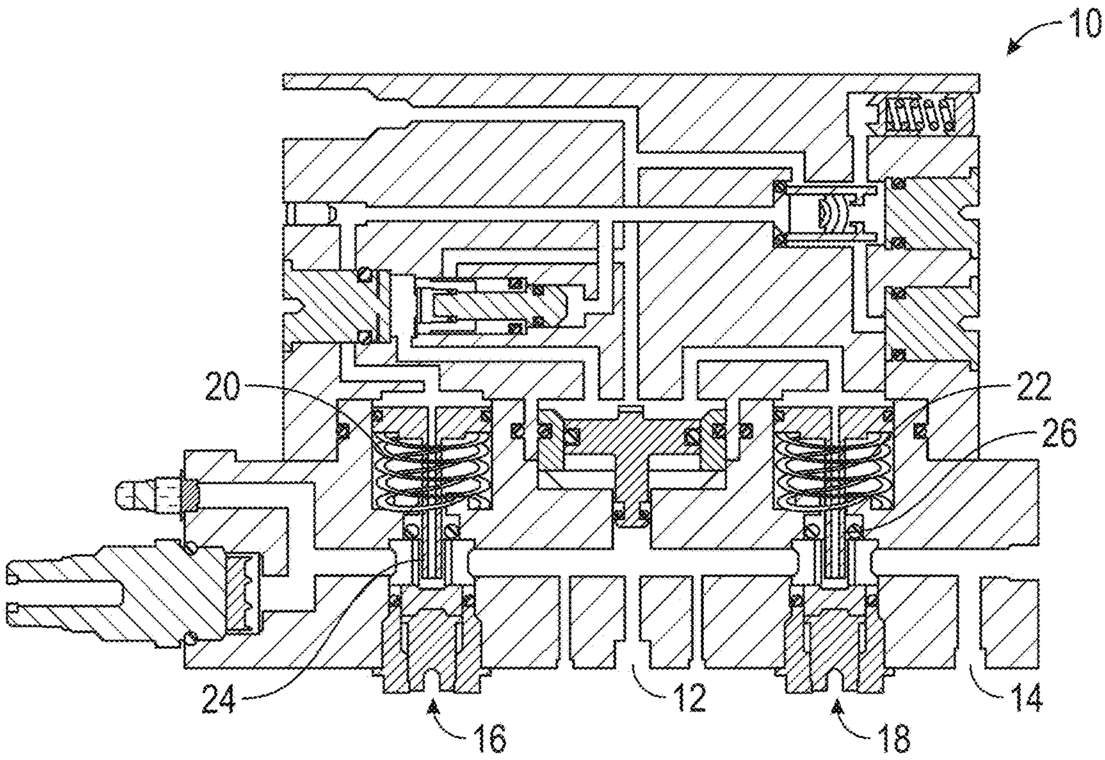
FIG. 1 is a schematic cross-sectional view of an embodiment of a pressure reducer for use with a self-contained breathing apparatus in its configuration when no air is being supplied to the reducer.

FIG. 1 illustrates pressure reducer 10 in a configuration in which no air is being supplied to it and system is therefore not pressurized. Pressure reducer 10 can be configured to accept air cylinders at input port 12 and/or input port 14, depending on the desired connection type. For the input port 12, a quick-connect configuration can be used that includes an inlet latch assembly that may include locking pins to lock a cylinder into position when air pressure is applied. For the input port 14, a high pressure hose assembly can be used to deliver cylinder air to the pressure reducer. It is understood that these input ports 12, 14 are intended to be representative and it is therefore contemplated that different and/or additional configurations and arrangements of input ports may be provided to the pressure reducer 10. Once cylinder air is present in the pressure reducer, the operation of the reducer will be generally the same regardless of the configuration used.

Pressure reducer 10 further includes a primary pressure reducer 16 and a secondary pressure reducer 18 that are adjacent to the input ports 12, 14. In the configuration of FIG. 1, springs 20, 22 of primary and secondary pressure reducers 16, 18, respectively, bias the primary and secondary pressure reducers 16, 18 toward an open position, thereby pushing their respective pistons 24, 26 away from their respective seating surfaces. Depending on the pressure reducer configuration, when a cylinder valve is opened, air will enter the pressure reducer through the input port 12 or input port 14. Pressurized air will then enter the primary and secondary ports through the center of the pistons 24, 26.

Figure 2:
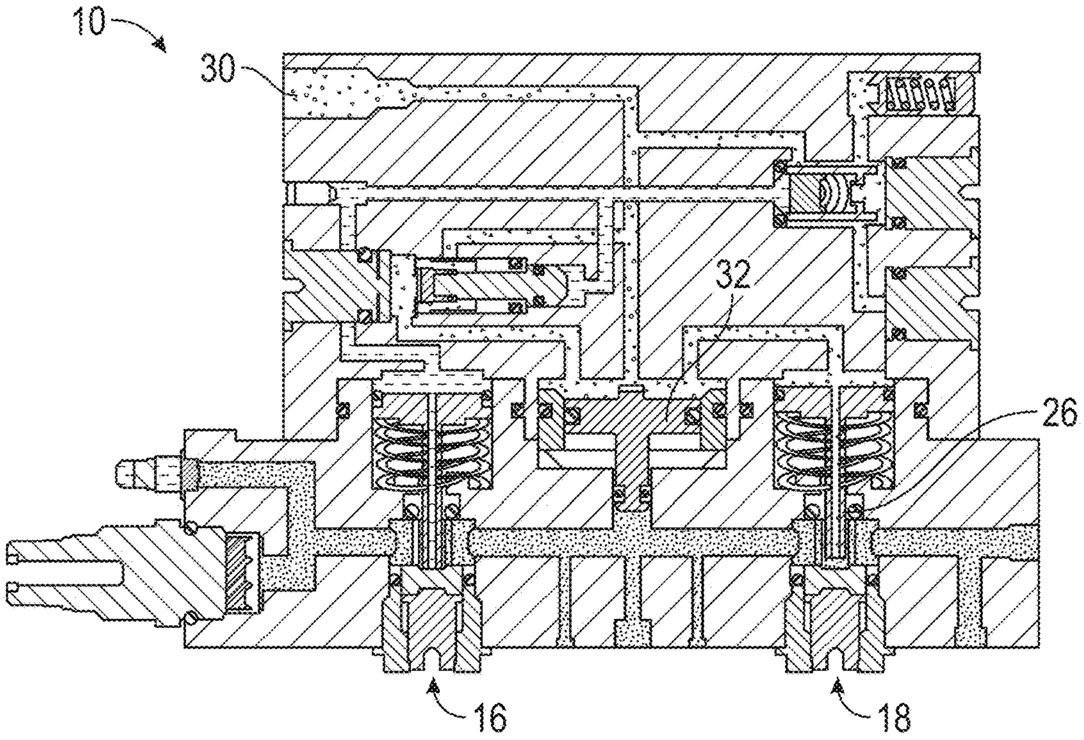
FIG. 2 is a schematic cross-sectional view of the embodiment of the pressure reducer of FIG. 1, in a configuration in which air having an initial secondary pressure is passing through a secondary pressure reducer along a path to an air outlet.

FIG. 2 illustrates the pressure reducer 10 in its initial secondary operation in which air initially passes through the piston 26 of the secondary pressure reducer 16 and moves along an air path to the outlet port 30. Typically, this configuration is maintained only briefly at the start of a pressure reducing operation. In this configuration, outlet port 30 is in communication with a mask mounted regulator that communicates with a face mask that a user is wearing. The air that passes through the secondary pressure reducer 18 will be higher than the general operating pressure that will be exiting the outlet port 30 once the reducer 10 reaches its steady state. In an embodiment, the air pressure exiting the outlet port at this initial secondary operation can be in a range of approximately 145 psi to 170 psi, for example. It is understood, however, that the pressure range can be lower or higher than this range. In any case, the air pressure will generally be sufficient to briefly activate the low pressure alarms or end-of-service time indicators that will be discussed below.

Figure 3:
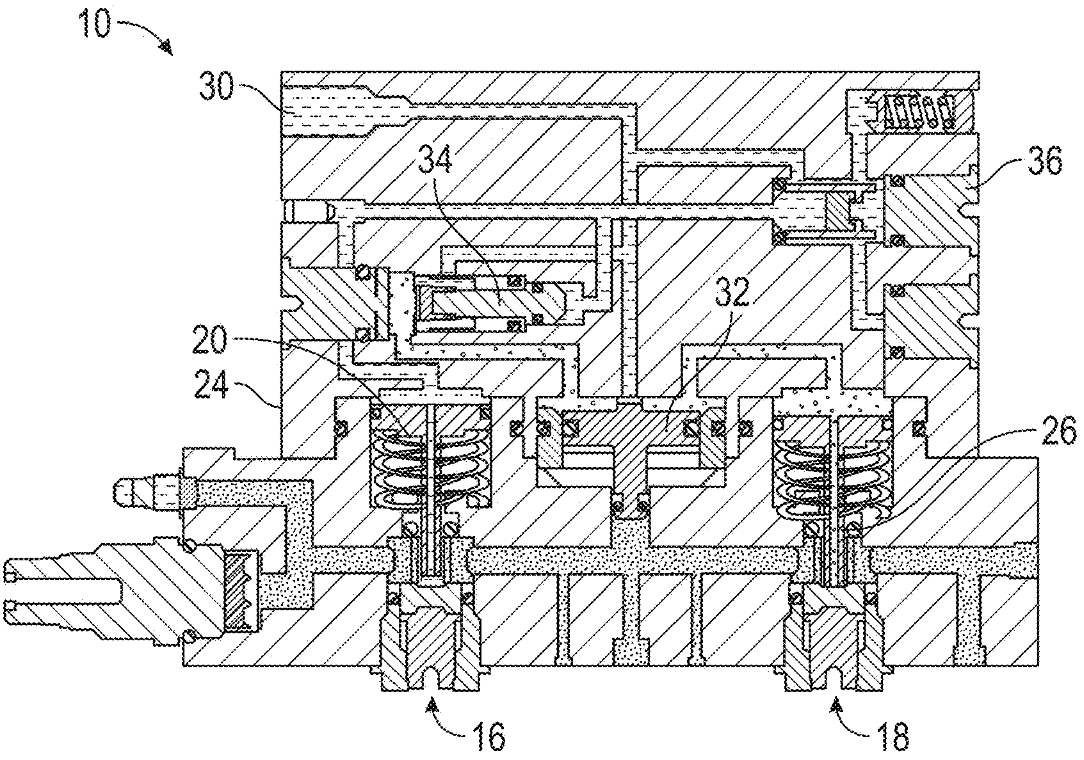
FIG. 3 is a schematic cross-sectional view of the embodiment of the pressure reducer of FIG. 1, in a configuration in which air is following an air path that includes a primary pressure reducer that reduces air pressure to a normal operating level at the air outlet.

High pressure air will continue entering through an inlet of the pressure reducer, causing a low cylinder transfer valve 32 to move upwardly from its position illustrated in FIG. 2, thereby closing the air path of the secondary pressure reducer 18, as is illustrated in FIG. 3. Air traveling through the secondary pressure reducer 18 is thereby prevented from entering the porting of the primary pressure reducer 16 by the low cylinder transfer valve 32 and an automatic transfer valve 34. Air that is trapped at the top of the secondary pressure reducer 18 will accumulate at the top of the piston 26 and force the piston 26 to close on its seating surface.

The pressure reducer 10 is now considered to be in a "standard" operating configuration in which air moves through the primary pressure reducer 16 to the outlet port 30, which then leads to the mask mounted regulator and face mask. In an embodiment, the air pressure that is now exiting the outlet port can be in a range of approximately 85 psi to 110 psi, for example. It is understood, however, that the pressure range can be lower or higher than this range. As the user inhales, the piston 24 of the primary pressure reducer 16 will open, allowing air to enter the air path or porting for the primary pressure reducer, as needed. When the user is not inhaling, the pressure in the air path or porting for the primary pressure reducer 16 will increase to a force that is greater than the pressure or bias of the spring 20, which will force the piston 24 to close on its seating surface.

Figure 4:
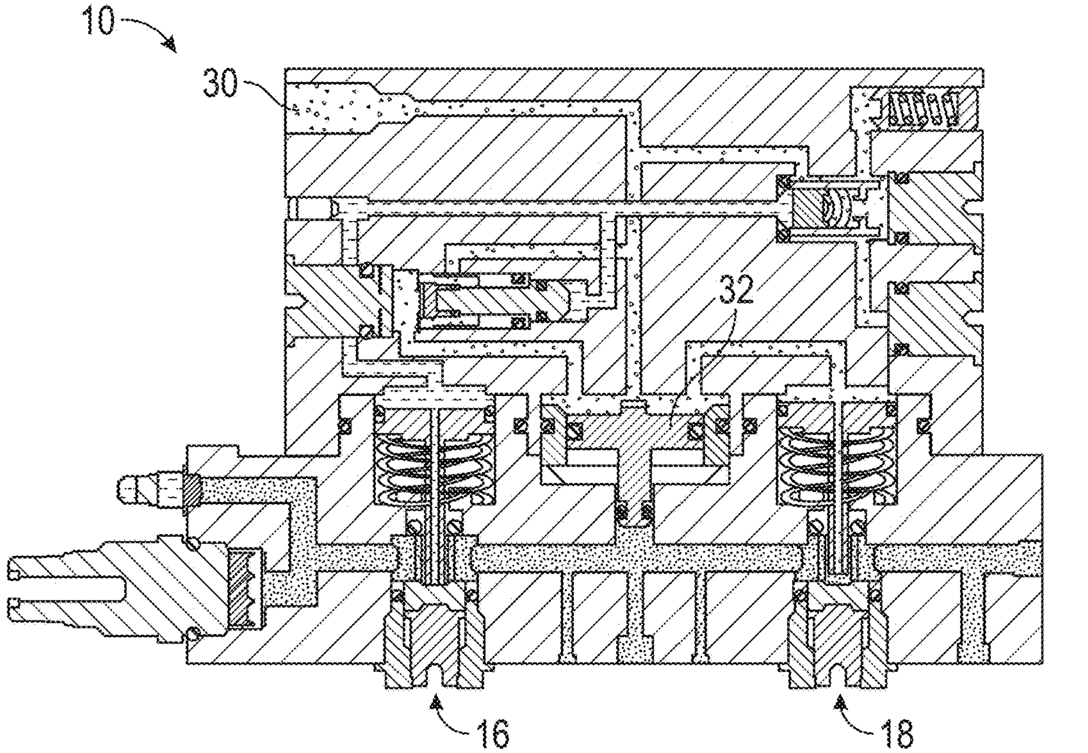
FIG. 4 is a schematic cross-sectional view of the embodiment of the pressure reducer of FIG. 1, in a configuration in which the rated pressure of an attached cylinder has reached a predetermined level of depletion such that air will pass through the secondary pressure reducer along a path to the air outlet.

This action of the primary pressure reducer 16 is repeatable for each inhalation/exhalation cycle until the pressure of the supply cylinder decreases to a predetermined level or amount. As one example, the predetermined level may be in the range of approximately 25% to approximately 37% of the rated service pressure of the cylinder and valve assembly. Such a level can be designed to correspond with an amount of time that is desired to be provided for the user to possibly complete a task and then move to a safe area and/or replace the cylinder. However, the predetermined level may instead be lower or higher than these exemplary levels. This reduced cylinder pressure will have allowed the air pressure from the high pressure inlet to the bottom of the low cylinder transfer valve 32 to also decrease. Such a pressure decrease will allow the low cylinder transfer valve 32 to move down and away from its seating surface, thereby allowing pressure from the secondary pressure reducer 18 to flow to the face mask, as is illustrated in FIG. 4. This secondary pressure of the air exiting from the outlet port 30 will again be in the range of approximately 145 psi to 170 psi, for example. A check valve 36 will also close and isolate the primary pressure reducer 16, thereby allowing the piston 24 of the primary pressure reducer 16 to close.

Figure 5:
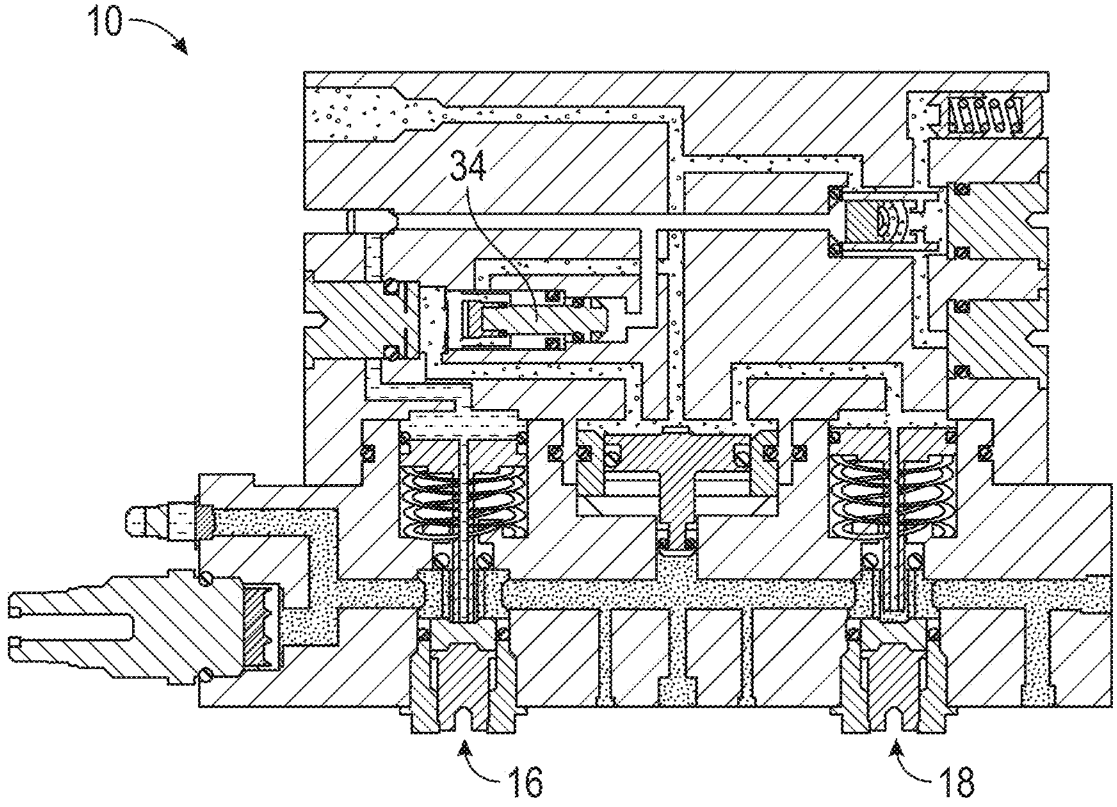
FIG. 5 is a schematic cross-sectional view of the embodiment of the pressure reducer of FIG. 1, in a configuration in which the primary pressure reducer has failed and the air passes through the secondary pressure reducer along a path to the air outlet.

FIG. 5 illustrates the pressure reducer 10 in a configuration in which the primary pressure reducer 16 has failed in its closed position. In this configuration, the automatic transfer valve 34 will open or move downward as a result of the decrease in the primary pressure. The secondary pressure reducer 18 will then serve the function of reducing the air pressure, which will then supply the user with air at a pressure that is above that of the normal operating pressure. The user will still be able to breathe normally at this pressure. That is, even though the cylinder pressure will be above the normal low cylinder activation pressure of a predetermined amount or percentage of the rated service pressure of the cylinder, the pressure reducer 10 will be providing air to the user's mask at the higher pressure.

Figure 6A:
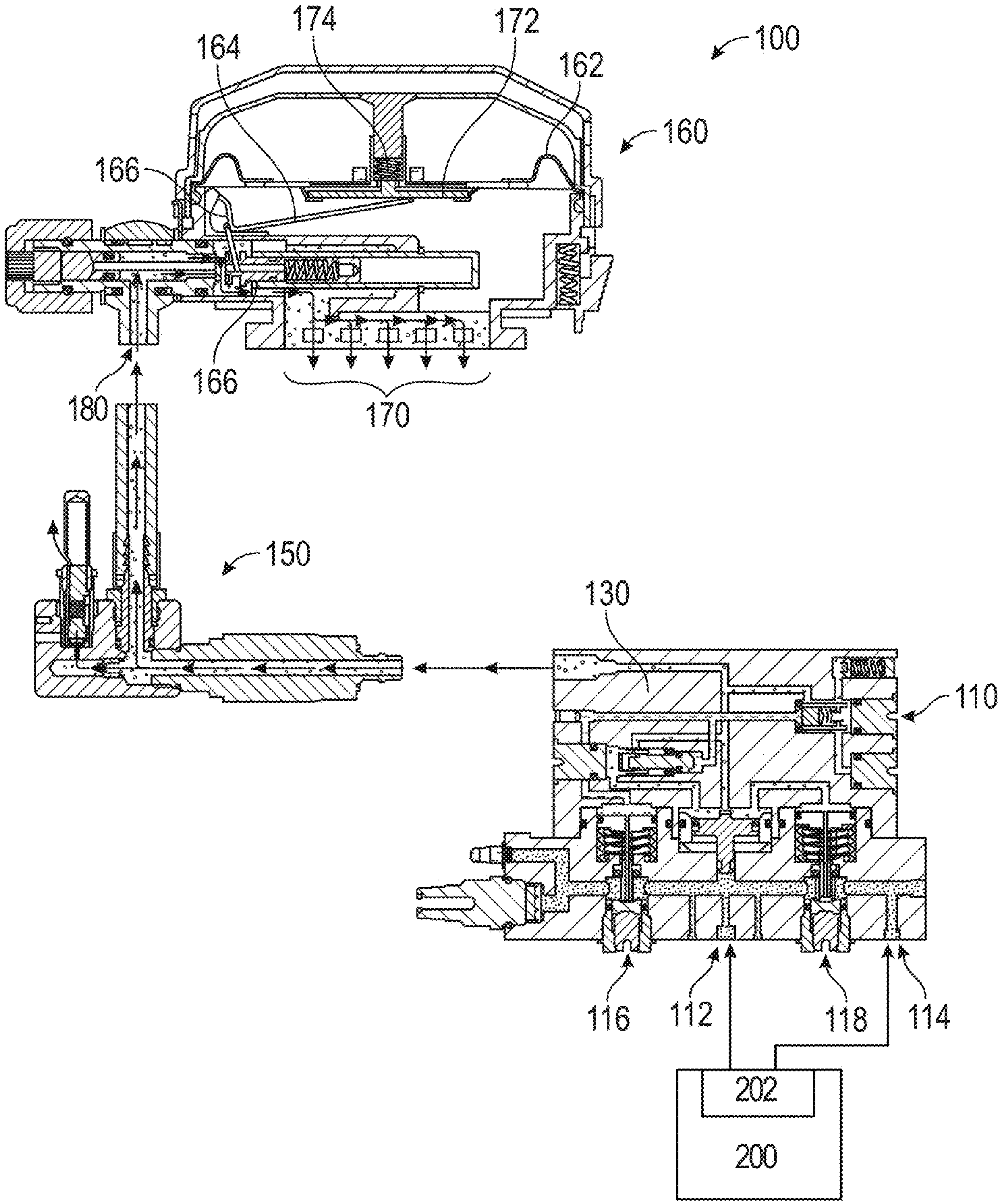
FIG. 6A is a schematic cross-sectional view of a pressure reducer system for use with a self-contained breathing system, including a pressure reducer, an end-of-service-time indicator, and a face mask, wherein the pressure reducer is in a configuration in which secondary pressure air is exiting the outlet port.

FIG. 6A illustrates a pressure reducer system 100 that includes a pressure reducer 110 configured generally in the manner described above relative to pressure reducer 10. Therefore, the discussion above of configurations and operations applies also to pressure reducer 110. As such, pressure reducer 110 also includes input ports 112, 114 connected to an air tank outlet 202 of an air tank 200, a primary pressure reducer 116, a secondary pressure reducer 118, and an outlet port 130. The system 100 further includes a low pressure end-of-service-time indicator 150 and a mask mounted regulator 160. Pressure reducer 110 is illustrated in a configuration that is similar to that shown in FIG. 4, which is the configuration in which the secondary pressure to the outlet port is at its higher level, either due to the air supply cylinder reaching a predetermined low cylinder activation pressure or due to a failure of the primary pressure reducer. In either case, the pressure of the air exiting the outlet 130 is sufficient to activate the indicator 150, which will alert the user of the condition of the cylinder. At this point, the user would typically move to an area where the self-contained breathing apparatus is no longer needed and/or will replace the depleted cylinder with a charged or partially charged cylinder. The indicator 150 may be connected to an inlet 180 to the face mask and may include a vibrating device or an audible whistle, for example.

With continued reference to FIG. 6A, the exemplary mask mounted regulator 160 operates by the action of a diaphragm 162 pressing down on a demand valve lever 164 during the user's inhalation. The demand valve lever 164 causes a piston lever 166 to pivot, thus moving a demand valve piston 168 from its seating area, thereby allowing air from the pressure reducer to flow through the mask mounted regulator 160 and into the face piece through the spray bar 170.

When the user exhales, exhaled air causes the diaphragm 162 to rise inside the regulator toward the regulator cover. A post in the center of the diaphragm 162 comes in contact with the cover, causing an exhalation valve 172 in the center of the diaphragm 162 to remain stationary while the outer portion of the diaphragm 162 continues to travel upward. This forces the center of the diaphragm 162 to open, creating a path for the air exhaled by the user to enter the ambient environment. As the exhalation cycle ends, the diaphragm 162 relaxes and a positive pressure spring 174 closes the exhalation valve 172 and positions the diaphragm 162 for the next inhalation cycle.

As is discussed above, FIG. 6A illustrates a configuration in which the secondary pressure to the mask mounted regulator 160 is at its relatively high or secondary pressure, which is sufficient to trigger or activate the end-of-service-time indicator 150, which is illustrated as an audible alarm configuration in this figure, but could instead be a vibrating alarm. In either case, the mask mounted regulator 160 will be connected to one port of the indicator 150 along a first air path, which may be an air path provided by a first hose (e.g., similar to a hose 152 illustrated in FIG. 7). Another port of the indicator 150 will be connected to the pressure reducer 110 along a second air path, which may be an air path provided by a second hose (e.g., similar to a hose 154 illustrated in FIG. 7).

Figure 6B:
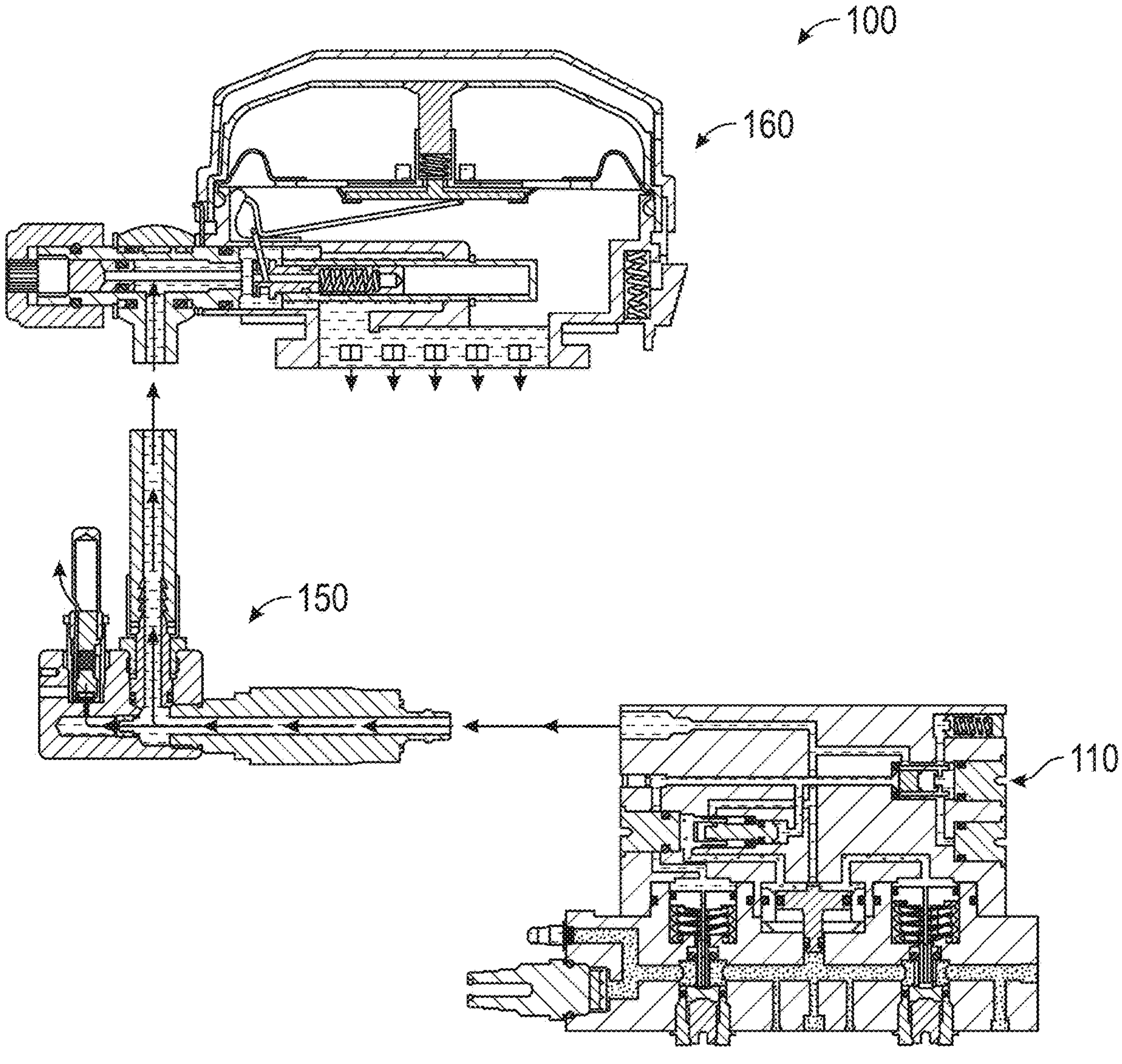
FIG. 6B is a schematic cross-sectional view of the pressure reducer system for use with a self-contained breathing system of FIG. 6A, but wherein the pressure reducer is in a configuration in which primary pressure air is exiting the outlet port.

FIG. 6B illustrates pressure reducer system 100 of FIG. 6A in its configuration that is similar to that shown in FIG. 3, which is the configuration in which the pressure to the outlet port is at its steady-state (i.e., operating) or lower level. In this configuration, the pressure of the air exiting the outlet is not sufficient to activate the indicator 150.

Figure 7:
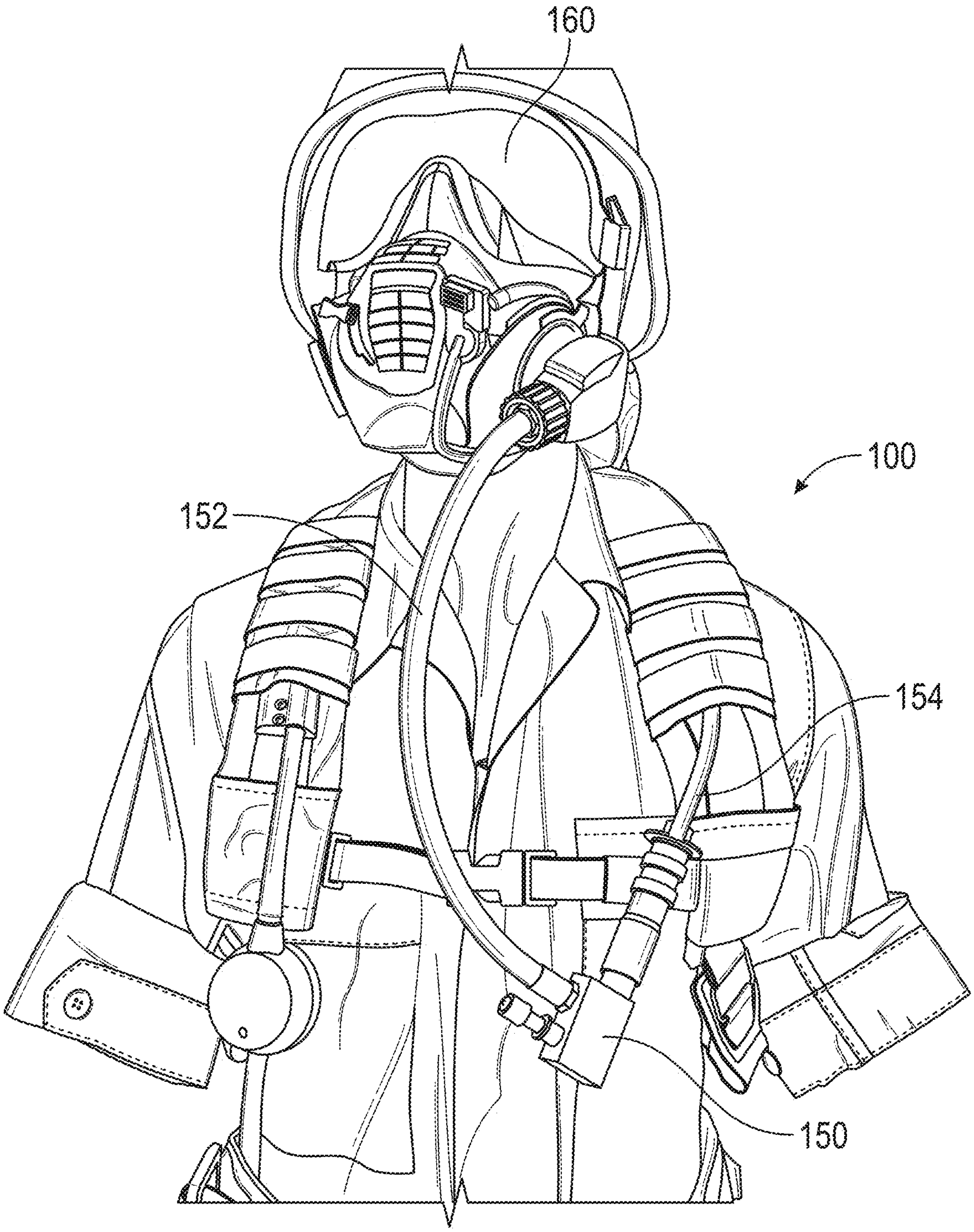
FIG. 7 is an exemplary front view of a user wearing a pressure reducer of the type described relative to FIGS. 6A and 6B.

FIG. 7 illustrates the pressure reducer system 100 as it can generally be worn by a user. As shown, the system includes face mask 160 that is connected to end-of-service-time indicator 150 by tube or hose 152. The system further includes tube or hose 154 that connects the other side of the end-of-service-time indicator 150 to a pressure reducer of the type described above (not visible), for example, that connects to at least one air cylinder. The end-of-service-time indicator 150 can be configured in the pressure reducer systems described herein to be positioned in the user's upper torso area. In this way, an activated end-of-service-time indicator can be detected quickly by the user.

While the discussion above refers to air paths between components and/or systems as being provided by hoses as an exemplary configuration, it is understood that the air paths discussed herein can be provided by any components that facilitate movement of air to provide air communication between two components. As such, the air paths can be considered to be "closed" such that they enclose the air moving between system components, such as flexible hoses or tubes, semi-flexible hoses or tubes, rigid or semi-rigid hoses or tubes, or combinations of these various components that define the air paths between components. Alternatively, the air paths can be more open or semi-open configurations.

As is discussed above, embodiments of the pressure reducer systems described herein include a vibrating alarm or an audible alarm, such as a whistle. These alarms are generally activated when the secondary transfer pressure increases to above a certain level when the cylinder is depleted to a predetermined level (e.g., in the range of approximately 25% to 37% of the rated service pressure of the cylinder and valve assembly). When air at this higher secondary transfer pressure moves to the outlet of the pressure reducer, it will travel through a hose to the end-of-service-time indicator. At this point, the alarm will be activated to alert the user of the depletion of air from the supply cylinder.

In accordance with embodiments of the pressure reducer systems described herein, the end-of-service-time indicators used can be made to be interchangeable such that a user can select and install the indicator into the system that is preferred for the environment in which the user will be entering. With such a system, the connections between items can be provided by "quick disconnect" fittings, if desired, which can allow for interchanging indicators without the use of additional tools. In alternative embodiments, the end-of-service-time indicators can be installed in such a way that tools are required to remove and/or replace them from the system. In any case, the systems can be provided as a kit with multiple options of alarms being available to the user.

Figure 8:
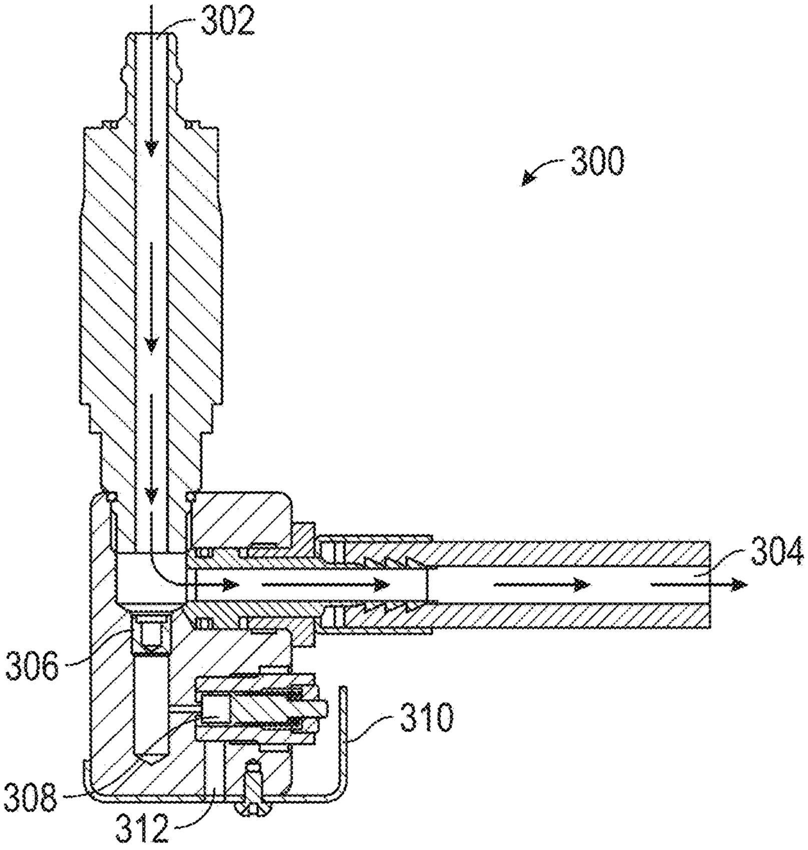
FIG. 8 is a cross-sectional view of an embodiment of a vibrating end-of-service indicator in a non-activated configuration.
Figure 9:
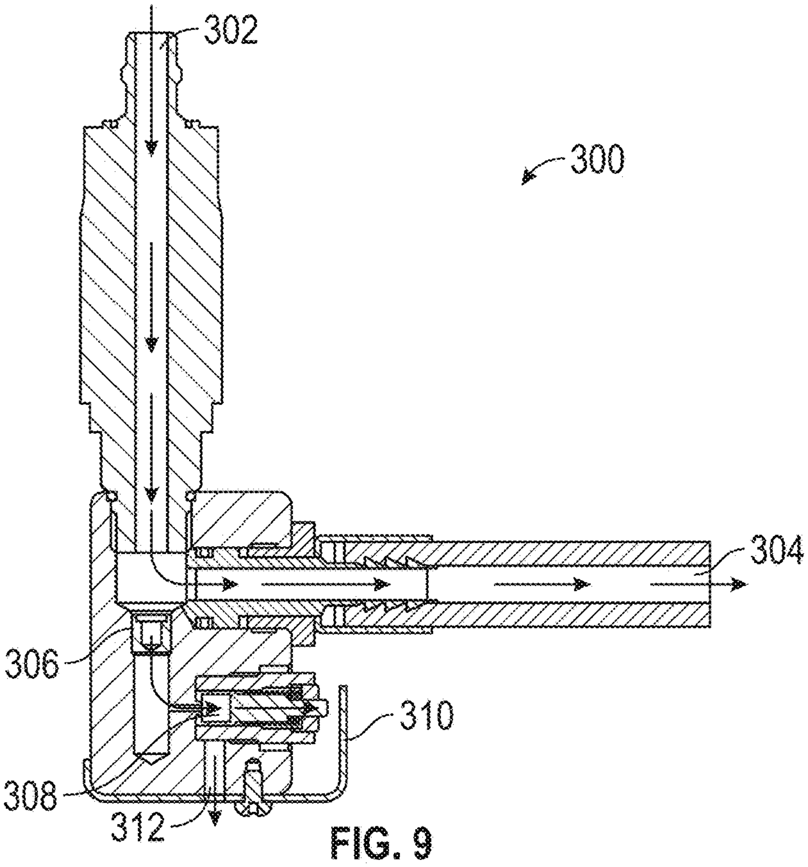
FIG. 9 is a cross-sectional view of the vibrating end-of-service indicator of FIG. 8 in an activated configuration.

Referring now to FIGS. 8 and 9, an exemplary embodiment is illustrated of a vibrating end-of-service indicator 300 in its non-activated configuration and in its activated configuration, respectively. Indicator 300 includes an inlet tube 302, an outlet tube 304, a flow orifice 306, a vibrator piston 308, a bracket 310, and an air vent 310. In FIG. 8, the vibrator piston 308 is seated, which is during a "no alarm condition" of the indicator 300 in which the pressure reducer is providing air to inlet tube 302 at its normal operating pressure. When the pressure entering the indicator at the inlet tube 302 increases to the secondary pressure or "alarm condition," as is shown in FIG. 9, the piston 308 will oscillate because it has a relief hole that allows pressure under the piston 308 to be relieved. The piston 308 can then reseat, after which pressure is again relieved, thereby creating an oscillating action as the valve hits the bracket 310. This action creates noise, which in an embodiment can be at a sound level above about 75 dBA, for example, at one or both of the user's ears.

Figure 10:
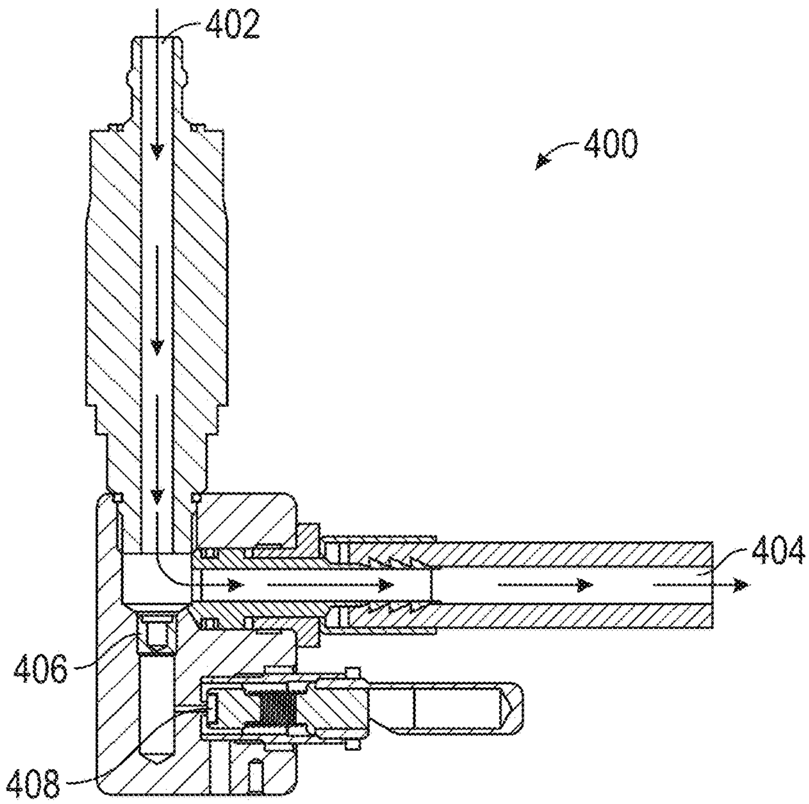
FIG. 10 is a cross-sectional view of an audible end-of-service indicator in a non-activated configuration.
Figure 11:
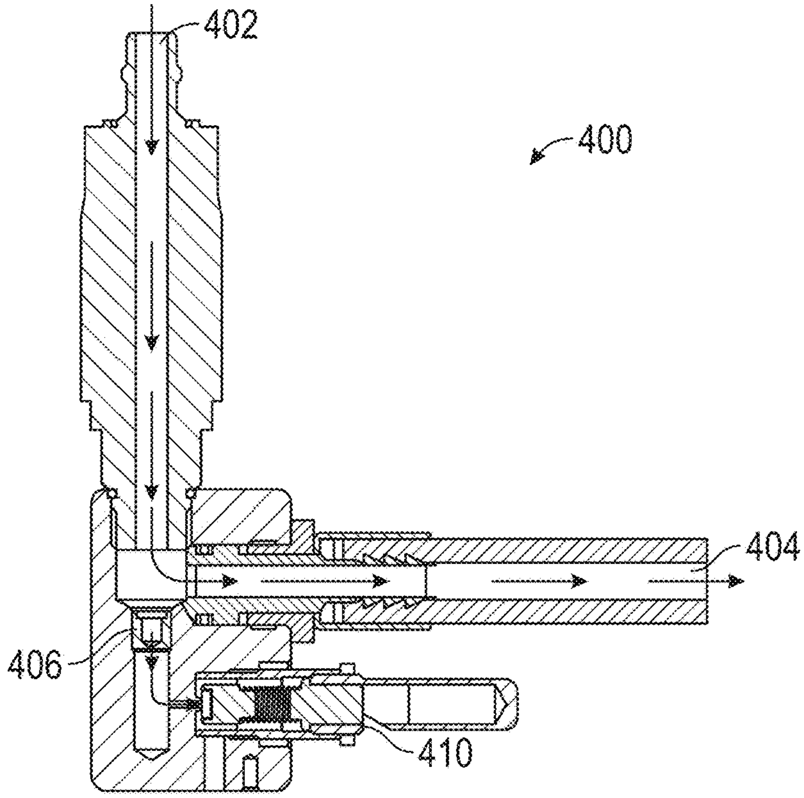
FIG. 11 is a cross-sectional view of the audible end-of-service indicator of FIG. 10 in an activated configuration.

FIGS. 10 and 11 illustrate an audible end-of-service indicator 400 in its non-activated configuration and in its activated configuration, respectively. Indicator 400 includes an inlet tube 402, an outlet tube 404, a flow orifice 406, a whistle piston 408, and an exit path 410 for air. In FIG. 10, the piston 408 is seated, which is during a "no alarm condition" of the indicator 400 in which the pressure reducer is providing air to inlet tube 402 at its normal operating pressure. When the pressure entering the indicator at the inlet tube 402 increases to the secondary pressure or "alarm condition," as is shown in FIG. 11, the piston 408 unseated, thereby allowing air to move along the exit path 410. The piston 408 thereby creates a whistle type of alarm sound at a sound level about 75 dBA, for example, at one or both of the user's ears The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A self-contained breathing system comprising:

a face mask;

an air tank for storing and delivering pressurized air;

a pressure reducer for reducing the pressure of pressurized air delivered by the air tank to a breathable pressure, wherein the pressure reducer comprises a pressure reducer input port that is in communication with an air tank outlet;

an alarm system comprising an alarm system inlet that is in communication with a pressure reducer outlet, wherein a first air path connects the pressure reducer outlet to the alarm system inlet, and wherein the alarm system further comprises an alarm system outlet; and a second air path in communication with the alarm system outlet and the face mask;

wherein the pressure reducer comprises a primary pressure reducer configured to work at a primary air pressure and a secondary pressure reducer configured to work at a secondary air pressure or upon a failure of the primary pressure reducer; and wherein the alarm system is configured to provide a detectable alarm upon receiving air from the secondary pressure reducer.

2. The self-contained breathing system of claim 1, wherein the alarm system comprises an end-of-service time indicator configured to provide the detectable alarm when at least one predetermined operating parameter is reached.

3. The self-contained breathing system of claim 1, wherein the detectable alarm comprises a vibrating member.

4. The self-contained breathing system of claim 1, wherein the detectable alarm comprises an audible alarm.

5. The self-contained breathing system of claim 1, wherein the detectable alarm comprises a sound with a sound level greater than 75 dBA.

6. The self-contained breathing system of claim 1, wherein the detectable alarm comprises a sound that is detectable by at least one of the user's ears.

7. The self-contained breathing system of claim 1, wherein the alarm system is positioned along an air path from the pressure reducer outlet and an inlet to the face mask.

8. The self-contained breathing system of claim 1, wherein the alarm system is spaced from the pressure reducer and positionable at a user's upper torso area.

9. The self-contained breathing system of claim 1, wherein the face mask comprises a mask-mounted regulator.

10. The self-contained breathing system of claim 1, wherein the alarm system is positionable such that it produces a vibration that is detectable by a user's upper torso area.

11. The self-contained breathing system of claim 1, wherein at least one of the first and second air paths is defined by a hose.

12. The self-contained breathing system of claim 1, wherein at least one of the first and second air paths is defined by one of a flexible hose, a flexible tube, a semi-flexible hose, a semi-flexible tube, a rigid hose, a rigid tube, a semi-rigid hose, a semi-rigid tube, or combinations thereof.

13. The self-contained breathing system of claim 1, wherein the alarm system is releasably attached to the first air path and the second air path.

14. The self-contained breathing system of claim 1, wherein the at least one predetermined operating parameter is the secondary air pressure at the pressure reducer outlet that is higher than the primary air pressure.

15. The self-contained breathing system of claim 14, wherein the primary air pressure is in the range of 85 psi 110 psi.

16. The self-contained breathing system of claim 14, wherein the secondary air pressure is in the range of 145 psi to 170 psi.

17. The self-contained breathing system of claim 14, wherein the secondary air pressure is in the range of 25% to 37% of a rated service pressure of the air tank.

18. A self-contained breathing apparatus kit comprising:

a face mask;

an air tank for storing and delivering pressurized air;

a pressure reducer for reducing the pressure of pressurized air delivered by the air tank to a breathable pressure, wherein the pressure reducer comprises a pressure reducer outlet and a pressure reducer input port that is in communication with an air tank outlet;

interchangeable alarm systems, each of which is releasably connectable by a first air path member to the pressure reducer outlet and is releasably connectable by a second air path member to the face mask;

wherein the pressure reducer further comprises a primary pressure reducer configured to work at a primary air pressure and a secondary pressure reducer configured to work at a secondary air pressure or upon a failure of the primary pressure reducer; and wherein each of the interchangeable alarm systems is configured to provide a detectable alarm upon receiving air from the secondary pressure reducer.

19. The self-contained breathing apparatus kit of claim 18, wherein at least one of the first air path member and the second air path member comprises a hose.

20. The self-contained breathing apparatus kit of claim 18, wherein the each of the alarm systems comprises any one of a vibrating alarm and an audible alarm.

* * * * *